G. F. KRIEGER.
TOOL HOLDER.
APPLICATION FILED SEPT. 19, 1917.
1,315,134. Patented Sept. 2, 1919.
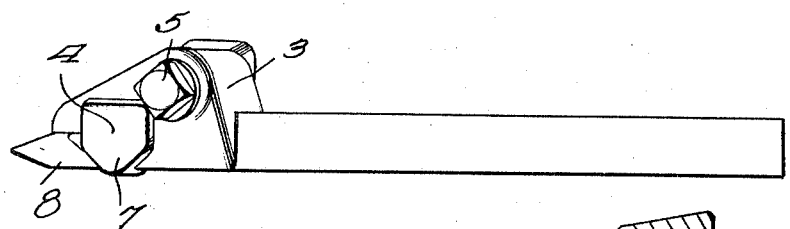
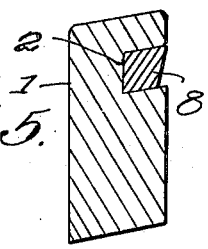
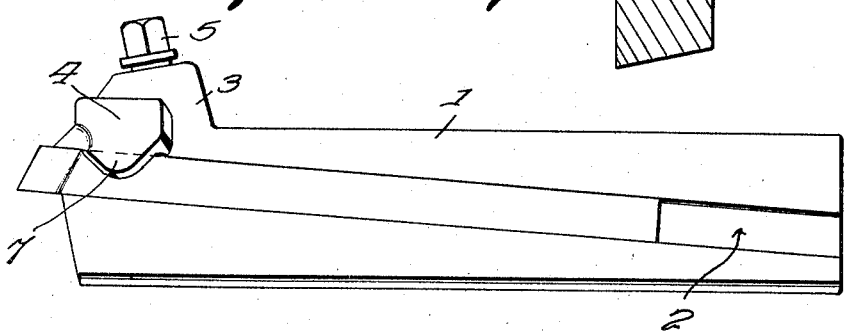
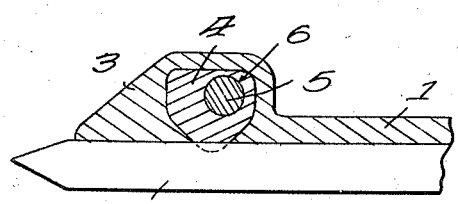
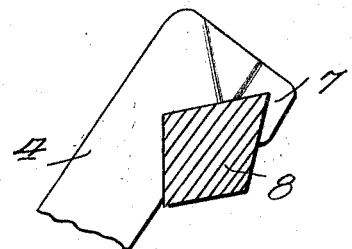
George F. Krieger
Inventor
By Geo. F. Kimmel
Attorney

UNITED STATES PATENT OFFICE.

GEORGE F. KRIEGER, OF GRAND RAPIDS, WISCONSIN.

TOOL-HOLDER.

1,315,134.     Specification of Letters Patent.     Patented Sept. 2, 1919.

Application filed September 19, 1917. Serial No. 192,108.

*To all whom it may concern:*

Be it known that I, GEORGE F. KRIEGER, a citizen of the United States, and resident of Grand Rapids, in the county of Wood and State of Wisconsin, have invented certain new and useful Improvements in Tool-Holders, of which the following is a specification.

This invention relates to tool holders and has more especial reference to improvements in lathe cutting tool holders.

The invention has for its dominant object to provide a tool holder which will firmly and securely hold a cutting tool in position to engage work arranged on a lathe and will prevent movement of the tool with relation to the work.

Another and equally important object of the invention is to provide a holder which, due to the manner of engaging cutting tools, will allow the same to be used until quite short, thus, effecting a material saving.

Other objects will be in part obvious and in part pointed out hereinafter.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the invention.

In the drawings:—

Figure 1 is a top plan of the improved cutting tool holder;

Fig. 2 is a side elevation thereof;

Fig. 3 is a fragmentary horizontal section through the holder;

Fig. 4 is a fragmentary detail of the cutter clamp, the cutter being shown in cross section; and Fig. 5 is a transverse section through the holder and cutting tool.

Having more particular reference to the drawings and in connection with which like reference characters will refer to corresponding parts throughout the several views, 1 represents the stock of the holder having a channel or way 2 formed longitudinally of the same and extending diagonally thereof. Upon one end of the stock there is formed a head 3 having an obliquely disposed opening passing therethrough, which opening serves as means for slidably receiving the cutting tool clamp designated 4, it being noted in this connection, that the tool clamp 4 is substantially triangular in cross section. A screw threaded bore is also formed in the head 3 and communicates with the clamp receiving opening above referred to. Fastening means comprising a set screw 5 are turned into engagement with the screw threaded bore and engage a pocket 6 formed in the triangular clamp 4, thus, locking the same against the sliding movement within the head 3 of the stock.

It is to be noted, that one end of the slidable clamp 4 is provided with a hooked head 7 so formed and arranged as to engage the slightly beveled side of a substantially square cutting tool 8, the cutting tool lying in the diagonally arranged channel 2 and projecting slightly beyond the same as shown in the Figs. 1 and 2.

The cutting tool 8, by being formed substantially square, yet, having a slightly beveled outer side, will maintain the sharp cutting edge for an extensive period of time, and thus eliminate continual resharpening of the same.

Due to the peculiar arrangement of the head 3 and the cutting tool clamp 4, it will be readily appreciated by workers skilled in the art that I am enabled to use cutting tools quite short, thus, effecting a material saving for the user. Further, the shape of the clamp and its respective head is such as to positively prevent undue movement of the cutting tool with relation to the stock when once clamped therein. Therefore, work as may be engaged by the cutting tool will be accurately and properly cut thereby.

Manifestly, the construction shown is capable of considerable modification and such modification as is within the scope of my claim, I consider within the spirit of my invention.

I claim:—

A tool holder including a stock having a way formed therein and an opening extending diagonally across one end portion thereof and opening into the way, a clamp slidable in said opening and having its head portion arranged adjacent to one end of the stock, and means engageable with said clamp for securing the same in adjusted position.

In testimony whereof, I affix my signature hereto.

GEORGE F. KRIEGER.

Copies of this patent may be obtained for five cents each, by addressing the "Commissioner of Patents, Washington, D. C."